United States Patent
Grimminger

(10) Patent No.: US 7,380,020 B2
(45) Date of Patent: May 27, 2008

(54) METHOD AND ARRANGEMENTS FOR ROUTER ADVERTISEMENT IN A NETWORK WITH MOBILE ANCHOR POINTS

(75) Inventor: Jochen Grimminger, München (DE)

(73) Assignee: Siemens Aktiengesellschaft, Munich (DE)

( * ) Notice: Subject to any disclaimer, the term of this patent is extended or adjusted under 35 U.S.C. 154(b) by 1015 days.

(21) Appl. No.: 10/332,959

(22) PCT Filed: Jul. 3, 2001

(86) PCT No.: PCT/DE01/02448

§ 371 (c)(1),
(2), (4) Date: Jan. 14, 2003

(87) PCT Pub. No.: WO02/07392

PCT Pub. Date: Jan. 24, 2002

(65) Prior Publication Data

US 2004/0039831 A1    Feb. 26, 2004

(30) Foreign Application Priority Data

Jul. 14, 2000   (DE) ............... 100 34 283

(51) Int. Cl.
*G06F 15/173* (2006.01)
*H04Q 11/00* (2006.01)
*H04L 12/26* (2006.01)
*H04L 12/28* (2006.01)

(52) U.S. Cl. ..................... 709/242; 709/238
(58) Field of Classification Search ............ 709/238, 709/241, 242; 370/351, 338, 401, 254, 252; 340/825

See application file for complete search history.

(56) References Cited

U.S. PATENT DOCUMENTS 6,421,731 B1 *   7/2002   Ciotti et al. ............. 709/238

OTHER PUBLICATIONS

Soliman et al., "Hierarchical Mobile IPv6 and Fast Handoffs", Mobile-IP Working Group, Internet-Draft, Jun. 28, 2000, pp. 1-17.
Kitamura, "Connection/Link Status Investigation (CSI) for Ipv6 IPv6 Hop-by-Hop Option and ICMPv6 Messages Extension", Internet-Draft, Feb. 26, 1999, pp. 1-17.
Stallings, "IPv6: The New Internet Protocol", IEEE Communications Magazine Jul. 1996, pp. 96-108.
Narten et al., Neighbor Discovery for IP Version 6 (IPv6), Internet Document: http://www.ietf.org/rfc/rfc2461.txt?number=2461, printed on May 7, 2000, pp. 1-76.

* cited by examiner

*Primary Examiner*—Glenton B. Burgess
*Assistant Examiner*—Philip Chea
(74) *Attorney, Agent, or Firm*—Staas & Halsey LLP

(57) ABSTRACT

Only the routers of mobile anchor points rather than all of the routers in a network, as was previously the case, have to modify the number of the mobile anchor points. The hops are calculated from the hop limit and the respective hop numbers in the respective mobile node.

12 Claims, 2 Drawing Sheets

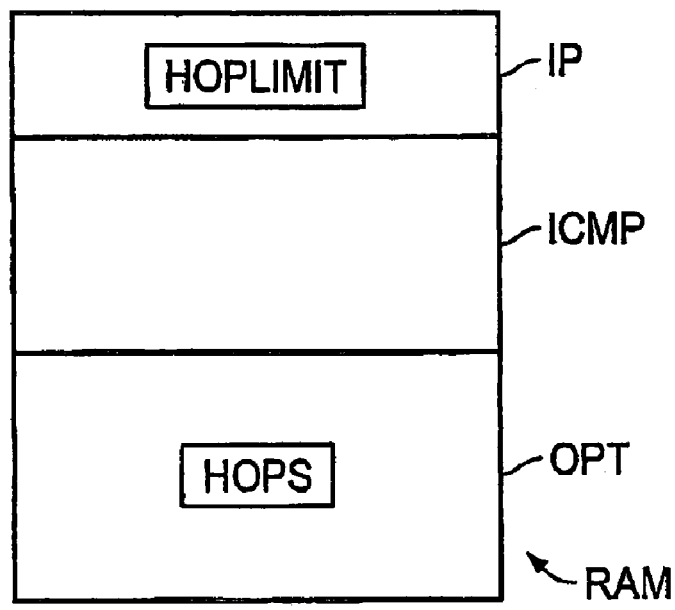

METHOD AND ARRANGEMENTS FOR ROUTER ADVERTISEMENT IN A NETWORK WITH MOBILE ANCHOR POINTS

CROSS REFERENCE TO RELATED APPLICATIONS

This application is based on and hereby claims priority to PCT Application No. PCT/DE01/02448 filed on 3 Jul. 2001 and German Application 100 34 283.3 filed on 14 Jul. 2000, the contents of which are hereby incorporated by reference.

BACKGROUND OF THE INVENTION

The invention relates to the transmission of a router advertisement message from a router from a mobile anchor point in a network to a possibly mobile node.

In a first publication www.ietf.org/internet-drafts/draft-soliman-mobileip-hmipv6-00.txt of 7.5.2000, a hierarchical mobile Internet protocol is presented which transmits a special message from a mobile anchor point (MAP) through a router network to a receiving mobile node. In this method, the routers of the mobile anchor points periodically send out router advertisement messages or respond to router inquiries. Future versions of this protocol will possibly include that receivers quietly ignore any options which do not recognize and forward these messages. The mobile anchor point is configured in such a manner that it receives or forwards its options or options forwarded from other mobile anchor points at special interfaces. The option of the mobile anchor point is forwarded within the hierarchy. Each router along this path up to the access router to the network will change the hop limits in the router advertisement message if a router, which is also a mobile anchor point, receives a router advertisement from another mobile anchor point, should the latter add its own MAP option to this and forward the two options to the further hierarchy level. The draft provides that all routers acquire the message, evaluate the payload, change it and send it out again. However, this requires special routers in the entire network.

SUMMARY OF THE INVENTION

One possible object of the invention then relates to specifying a method and a system in which a router advertisement message can be changed and forwarded faster from a first mobile anchor point to a mobile node.

One aspect of the invention involves only the routers of mobile anchor points (MAPs) rather than all of the routers in a network as was previously the case have to modify the hop numbers of the mobile anchor points and that the hops are calculated from the hop limit and the respective hop numbers in the respective mobile node.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 2 shows the structure of a router advertisement message for explaining one embodiment of the invention, FIG. 3a shows the development of the message of FIG. 2 with time using the example of FIG. 1 when the method according to one embodiment of the invention is applied and FIG. 3b, for comparison, shows the development of the message of FIG. 2 with time using the example of FIG. 1 when the known method is used.

DETAILED DESCRIPTION OF THE PREFERRED EMBODIMENT

Figure 1:
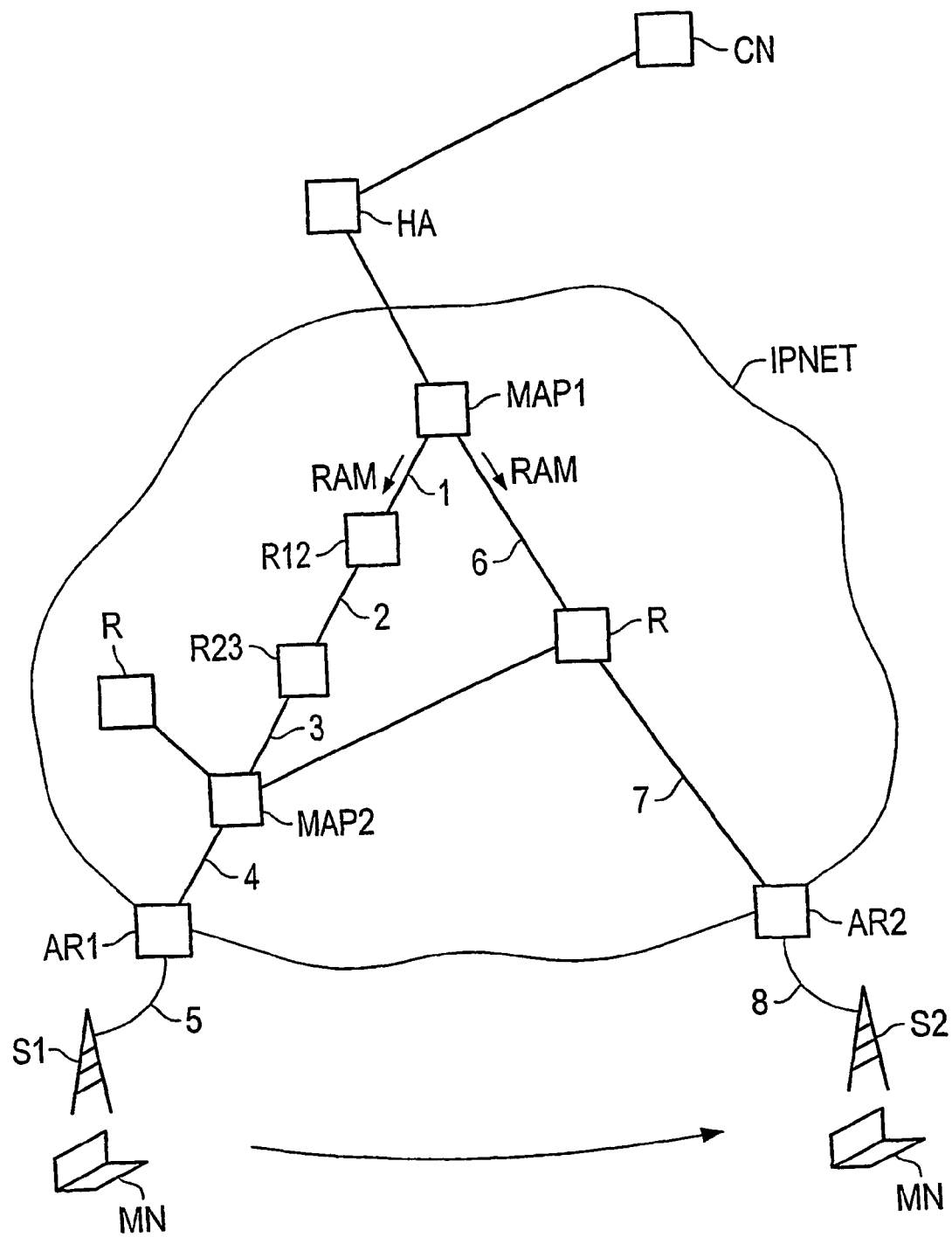
FIG. 1 shows a basic diagram of a mobile hierarchical network for explaining one embodiment of the invention.

Reference will now be made in detail to the preferred embodiments of the present invention, examples of which are illustrated in the accompanying drawings, wherein like reference numerals refer to like elements throughout.

FIG. 1 shows a basic diagram of a hierarchical mobile network, in which a mobile node MN can be connected either via a mobile radio station S1 with an access router AR1 or via a mobile radio station S2 with a further access router AR2 to a network, for example a local IP network IPNET. In addition, for example, a corresponding node CN is connected to a computer which represents a so-called home agent HA for the mobile node MN. This home agent HA, in turn, is connected, for example, to a router of the IP network which forms a first mobile anchor point MAP1. However, the node CN can also communicate, for example, directly with the node MN. In this case, the mobile anchor point MAP1 sends router advertisement messages at regular intervals via a path 1 to 5 or a path 6 to 8 to the mobile MN, whereupon the latter reports, for example, to the home agent HA and then to the mobile anchor point MAP1. On the path 1 to 5, normal routers R12, R23 and also a router for a further mobile anchor point MAP2 and an access router AR1 for the network IPNET are located. On the path 6 to 8, there is also a series of routers R and an access router AR2 at the end.

FIG. 2 diagrammatically shows the structure of a router advertisement message RAM and in the Internet protocol IP v6 www.ietf.org/rfc/rfc2461.txt of 7.5.2000, such a message has a first part IP, a second part ICMP and a third part OPT. The IP part represents a message header and the OPT part contains optional information. In the header IP, there is a data field for a hop limit or HOPLIMIT and in the OPT part, there are hop counters HOPS for mobile anchor points.

In FIG. 3a, the development of the router advertisement message RAM along the path 1 to 5 during the execution of the method according to one aspect of the invention is shown by the path 1 to 5 shown in FIG. 1. At the beginning, the hop limit or HOPLIMIT is set, for example, to the maximum value=30 and after the router MAP1, the hop counter HOPS (MAP1) is=1 for the router MAP1 and is changed only by the next mobile anchor point MAP2. The hop limit HOPLIMIT is decremented by one after each router and reset again to the maximum value by the next mobile anchor point MAP2. The second mobile anchor point then calculates HOPS (MAP1)=original 1+max HOPLIMIT−current HOPLIMIT+increment 1. Therefore, HOPS (MAP1)=1+30−28+1=4. The second mobile anchor point and sets the hop counter HOPS (MAP2) to 1. Since the access router AR1 is not a MAP, only the hop limit or HOPLIMIT is set to 29 and the hop counters remain at 4 and 1. In the mobile node, the hop numbers are then in each case incremented by max HOPLIMIT−current HOPLIMIT=30−29 =1, as a result of which the hop numbers in the mobile node are calculated at 5 and 2 in a very simple manner.

For comparison, FIG. 3b shows the development of the messages RAM on the path 1 to 5 proposed in the related art. Here, too, the hop limit is decremented by 1 after each router and reset back to the maximum value by a router for a further mobile anchor point MAP2. The essential difference is, however, that each router modifies the hop counters in the further part OPT of the message RAM which means a much higher time consumption. At the end, the hop counters here, too, contain the hop numbers 5 and 2.

It is also essential here that the normal routers no longer need to read and evaluate the payload for this purpose. In the normal Internet protocol IP v6, the hop limit is incremented in any case by every router. As a result, the forwarding further mobile anchor point MAP2 has all the information for setting the hop counters to the correct values. The mobile anchor point MAP2 must in any case calculate the payload of the packet and thus it only means little additional expenditure for calculating the hop counters. The same applies to the mobile node MN. It only needs to add the hop counters between the last mobile anchor point and itself to the received hop counters. It is of particular advantage that only a slight change in software is required for a considerable improvement in speed.

The invention has been described in detail with particular reference to preferred embodiments thereof and examples, but it will be understood that variations and modifications can be effected within the spirit and scope of the invention.

The invention claimed is:

1. A method for router advertisement in a data network having routers, a portion of which serve as mobile anchor points, comprising:
   forwarding a router advertisement message along a path including at least one router serving as a mobile anchor point and at least one router not serving as a mobile anchor point from a router serving as a first mobile anchor point via a plurality of further routers to a mobile node, the router advertisement message containing a hop limit and hop counts,
   changing the hop limit by every router after the first mobile anchor point,
   changing at least one of the hop counts only at the mobile anchor points and not at routers that are not mobile anchor points, and
   for changing the hop counts, calculating hops between the mobile node and the mobile anchor points from the hop limit and the respective hop counts, as they read in a received router advertisement message.

2. A method according to claim 1, wherein the hop counts are not read by a router unless the router serves as a mobile anchor point.

3. A mobile anchor point for a data network having routers, a portion of which serve as mobile anchor points, the data network forwarding a router advertisement message along a path including at least one router serving as a mobile anchor point and at least one router not serving as a mobile anchor point from a first mobile anchor point to a mobile node via a plurality of routers, the router advertisement message containing a hop limit and a hop count, comprising:
   a calculation unit to calculate hops between the mobile anchor point and a previous mobile anchor point, the hops being calculated from an unchanged hop limit and the hop count that is changed only at the mobile anchor points and not at routers that are not mobile anchor points, as read from a received router advertisement message, the unchanged hop limit being a hop limit which was not changed since the previous mobile anchor point, the router advertisement message containing the unchanged hop limit, the calculation unit producing a result; and
   a change unit to change the hop count based on the result produced by the calculation unit.

4. A mobile anchor point according to claim 3, wherein the router advertisement message contains a plurality of hop counts.

5. A mobile anchor point according to claim 3, wherein the first mobile anchor point serves as the previous mobile anchor point.

6. A mobile anchor point according to claim 3, wherein each router after the first mobile anchor point changes the hop limit by one unit.

7. A mobile anchor point according to claim 3, wherein the hop count is not read by a router unless the router serves as a mobile anchor point.

8. A mobile node for a data network having routers, a portion of which serve as mobile anchor points, comprising:
   a receive unit to receive a router advertisement message forwarded along a path including at least one router serving as a mobile anchor point and at least one router not serving as a mobile anchor point from a first mobile anchor point to the mobile node via a plurality of routers, the router advertisement message containing a hop count; and
   a calculation unit to calculate hops between the mobile node and a previous anchor point, the hops being calculated from an unchanged hop limit and the hop count that is changed only at the mobile anchor points and not at routers that are not mobile anchor points, the unchanged hop limit being a hop limit which was not changed since the previous anchor point, the router advertisement message containing the unchanged hop limit such that the calculation unit calculates hops based on the router advertisement message received by the receive unit.

9. A mobile node according to claim 8, wherein the router advertisement message contains a plurality of hop counts.

10. A mobile node according to claim 8, wherein the first mobile anchor point serves as the previous mobile anchor point.

11. A mobile node according to claim 8, wherein each router after the first mobile anchor point changes the hop limit by one unit.

12. A mobile node according to claim 8, wherein the hop count is not read by a router unless the router serves as a mobile anchor point.

* * * * *